(12) United States Patent
Chung et al.

(10) Patent No.: US 10,160,326 B2
(45) Date of Patent: Dec. 25, 2018

(54) APPARATUS FOR PREVENTING OVERCHARGE OF BATTERY IN ECO-VEHICLE

(71) Applicants: HYUNDAI MOTOR COMPANY, Seoul (KR); KIA MOTORS CORPORATION, Seoul (KR)

(72) Inventors: Tae Hwan Chung, Incheon (KR); Jong Hu Yoon, Anyang-si (KR); Beom Gyu Kim, Hwaseong-si (KR); Mi Ok Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/366,916

(22) Filed: Dec. 1, 2016

(65) Prior Publication Data

US 2018/0009317 A1 Jan. 11, 2018

(30) Foreign Application Priority Data

Jul. 5, 2016 (KR) ........................ 10-2016-0084848

(51) Int. Cl.
*H01M 10/42* (2006.01)
*H01M 10/44* (2006.01)
(Continued)

(52) U.S. Cl.
CPC .............. *B60L 3/0046* (2013.01); *B60L 3/04* (2013.01); *B60L 3/12* (2013.01); *B60L 7/10* (2013.01); *B60L 7/14* (2013.01); *B60L 11/1814* (2013.01); *B60L 11/1861* (2013.01); *H01M 10/425* (2013.01); *H01M 10/44* (2013.01); *H01M 10/48* (2013.01); *H02M 7/44* (2013.01); *B60L 2210/40* (2013.01); *B60L 2240/547* (2013.01);
(Continued)

(58) Field of Classification Search
None
See application file for complete search history.

(56) References Cited

U.S. PATENT DOCUMENTS 4,280,161 A * 7/1981 Kuhn ..................... H02H 7/065
361/104
8,917,058 B2 * 12/2014 Hirai ..................... H02J 7/1423
307/150
(Continued)

FOREIGN PATENT DOCUMENTS

EP 1993185 A2 11/2008
EP 2337182 A2 6/2011
(Continued)

OTHER PUBLICATIONS

Extended European Search Report issued in corresponding European Patent Application No. 16202479.8, dated Jun. 7, 2017.
(Continued)

*Primary Examiner* — Navid Ziaeianmehdizadeh
(74) *Attorney, Agent, or Firm* — McDermott Will & Emery LLP

(57) ABSTRACT

An apparatus for preventing overcharge of a battery in an eco-vehicle includes: a detector detecting the overcharge of the battery; and a signal processor controlling a high voltage relay according to an output signal output from the detector to block a charge of the battery.

12 Claims, 10 Drawing Sheets

(51) Int. Cl.
  *B60L 3/04* (2006.01)
  *B60L 3/00* (2006.01)
  *B60L 7/14* (2006.01)
  *B60L 11/18* (2006.01)
  *H02M 7/44* (2006.01)
  *B60L 3/12* (2006.01)
  *B60L 7/10* (2006.01)
  *H01M 10/48* (2006.01)
  *H02H 7/18* (2006.01)

(52) U.S. Cl.
  CPC . *B60Y 2300/18125* (2013.01); *B60Y 2300/91* (2013.01); *B60Y 2300/92* (2013.01); *B60Y 2400/112* (2013.01); *H01M 2010/4271* (2013.01); *H01M 2200/00* (2013.01); *H02H 7/18* (2013.01)

(56) References Cited

U.S. PATENT DOCUMENTS

| | | | |
|---|---|---|---|
| 9,768,627 B2* | 9/2017 | Lee | H02J 7/0031 |
| 2008/0284375 A1 | 11/2008 | Nagaoka et al. | |
| 2009/0001926 A1* | 1/2009 | Sato | B60L 3/0046 |
| | | | 320/102 |
| 2011/0001352 A1* | 1/2011 | Tamura | B60R 16/033 |
| | | | 307/9.1 |
| 2011/0140665 A1* | 6/2011 | Tamezane | H02J 7/0016 |
| | | | 320/118 |
| 2012/0019191 A1* | 1/2012 | Yoshida | B60L 11/1885 |
| | | | 320/101 |
| 2012/0025768 A1* | 2/2012 | Nakano | B60L 11/005 |
| | | | 320/116 |
| 2014/0203786 A1* | 7/2014 | Oosawa | H02J 7/0031 |
| | | | 320/136 |
| 2014/0232302 A1* | 8/2014 | Tsushima | H02J 7/00 |
| | | | 318/139 |
| 2015/0165927 A1* | 6/2015 | Jeon | B60L 11/1872 |
| | | | 307/9.1 |
| 2015/0229143 A1* | 8/2015 | Kaita | H02J 7/0021 |
| | | | 320/118 |
| 2015/0229154 A1* | 8/2015 | Kaita | B60L 11/1861 |
| | | | 320/118 |
| 2016/0056646 A1* | 2/2016 | Lee | H02J 7/0031 |
| | | | 320/163 |
| 2016/0096441 A1 | 4/2016 | Lee et al. | |

FOREIGN PATENT DOCUMENTS

| | | |
|---|---|---|
| JP | H08-289843 A | 11/1996 |
| JP | 2014-171285 A | 9/2014 |
| KR | 10-1998-079042 A | 11/1998 |
| KR | 10-0580381 B1 | 5/2006 |
| KR | 10-2013-0084875 A | 7/2013 |
| KR | 10-2014-0078910 A | 6/2014 |
| KR | 10-1457986 B1 | 11/2014 |
| KR | 10-2016-0023172 A | 3/2016 |
| KR | 10-2016-0039940 A | 4/2016 |
| KR | 10-2016-0070885 A | 6/2016 |
| WO | 2014-087213 A1 | 6/2014 |

OTHER PUBLICATIONS

Korean Office Action issued in corresponding Korean Patent Application No. 10-2016-0084848, dated Feb. 20, 2018.

* cited by examiner

APPARATUS FOR PREVENTING OVERCHARGE OF BATTERY IN ECO-VEHICLE

CROSS-REFERENCE TO RELATED APPLICATION

This application claims the benefit of priority to Korean Patent Application No. 10-2016-0084848, filed on Jul. 5, 2016 in the Korean Intellectual Property Office, the entirety of which is incorporated herein by reference.

TECHNICAL FIELD

The present disclosure relates to an apparatus for preventing overcharge of a battery in an eco-vehicle which may electrically prevent the overcharge of the battery even in a case in which the battery management system fails.

BACKGROUND

A battery system in an eco-vehicle has been developed to have increased energy density and output density in response to increased demand for high output/high energization, but battery stability has been degraded. Therefore, in order to improve the stability of the battery system, research continues to be performed regarding vehicle cooperative control, battery management system (BMS) active protection, pack passive protection, and cell robustness design.

According to the related art, a method has been suggested where a battery charge is blocked by breaking a lead tap when a cell swelling occurs at the time of overcharge of the battery, or a swelling of an end plate is used.

In particular, as illustrated in FIG. 1, an apparatus for physically preventing overcharge turns off a relay Ry of 12V when a switch SW disposed in the front of a cell is pressed at the time of the overcharge, to thereby block a power relay assembly (PRA). According to the apparatus for physically preventing overcharge described above, since the lead tap of the cell becomes thick as the cell becomes high capacity, the breaking of the lead tap is not smooth, or it is impossible to reuse such as an additional charge after a physical fail situation.

In addition, as illustrated in FIG. 2, the apparatus for physically preventing overcharge has a structure in which the cell expands due to the overcharge of the battery B, and the cell presses the switch SW disposed at the outermost of the cell to operate the switch SW. However, since a degree of expansion of the cell is about several millimeters (mm), it is difficult to determine an appropriate operation time point of the switch and there is the possibility of malfunction of the switch due to transport and impact.

As such, the apparatus for physically preventing overcharge prevents the battery from being used any more by performing detection and protection functions after an overcharge event.

However, such an apparatus for physically preventing overcharge has a limit in that a protection operation is performed after a fail situation in which the cell is swelled together with an increase in temperature at the time of the overcharge of the battery.

In addition, the apparatus for physically preventing overcharge may not perform the cooperative control and the active protection in a state in which the BMS is structurally inoperable.

SUMMARY

The present disclosure has been made to solve the above-mentioned problems occurring in the prior art while advantages achieved by the prior art are maintained intact.

An aspect of the present disclosure provides an apparatus for preventing overcharge of a battery in an eco-vehicle which may electrically prevent the overcharge of the battery even in a case in which the battery management system fails.

According to an exemplary embodiment in the present disclosure, an apparatus for preventing overcharge of a battery in an eco-vehicle includes: a detector detecting the overcharge of the battery; and a signal processor controlling a high voltage relay according to an output signal output from the detector to block a charge of the battery.

The detector may include: an overcharge sensor sensing whether or not a cell voltage of the battery exceeds a reference voltage; and a photo-coupler outputting an overcharge detection signal when the cell voltage exceeds the reference voltage.

The overcharge sensor may include: a plurality of resistors for setting the reference voltage; and a shunt regulator through which a current flows when the cell voltage exceeds the reference voltage.

The detector may further include a zener diode disposed between a battery cell and the photo-coupler to control an operation initiation time point of an overcharge protection function of the battery.

The detector may initiate an operation of the overcharge protection function of the battery when the cell voltage arrives at a breakdown voltage of a zener diode.

The signal processor may include: a power source supplying power to the detector; a flip-flop outputting an output signal according to an overcharge detection signal when receiving the overcharge detection signal output from the detector; a plurality of logical elements performing a logic operation using the output signal of the flip-flop to output a control signal according to a result of the logic operation; and a driver including a plurality of switches connected to the plurality of logical elements, respectively, and controlling operations of the plurality of switches according to the control signal to drive a high voltage relay.

The signal processor may include: a power source supplying power to the detector; a programmable device receiving the output signal output from the detector to judge whether or not the received signal is noise; a plurality of logical elements outputting a control signal according to a judgment result of the programmable device; and a driver including a plurality of switches connected to the plurality of logical elements, respectively, and controlling operations of the plurality of switches according to the control signal to drive a high voltage relay.

The programmable device may be a complex programmable logic device (CPLD).

The apparatus may further include a controller controlling an initialization of the programmable device.

The detector may detect the overcharge of the battery by monitoring a cell voltage of the battery.

The signal processor may control the high voltage relay according to the output signal output from the detector to block the charge of the battery when the detector detects the overcharge of the battery.

The battery may be charged using regenerative power generated at the time of braking of the eco-vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Throughout the present specification, since the terms "comprising", "configuring", "having", and the like mean that the corresponding element may be embedded unless explicitly described to the contrary in the present specification, it means the inclusion of other elements rather than the exclusion of any other elements.

In addition, the terms "-er", "-or", "module", and the like described in the present specification mean units for processing at least one function and operation, and can be implemented by hardware, software, or combinations thereof. In addition, articles such as "a", "an", "the", and the like may be used to include both singular forms and plural forms unless the context clearly indicates otherwise, in the context describing the present disclosure.

Hereinafter, exemplary embodiments of the present disclosure will be described in detail with reference to the accompanying drawings.

The present disclosure provides a basic secondary protection measure capable of electrically preventing overcharge of a battery even in the case in which a battery management system (BMS) fails.

According to the present disclosure, since a cell voltage of the battery is monitored and an overcharge situation is monitored and blocked independent from a failure state of the BMS, it is possible to protect the battery from overcharge even in a case in which the BMS fails, and to improve overcharge stability.

Figure 1:
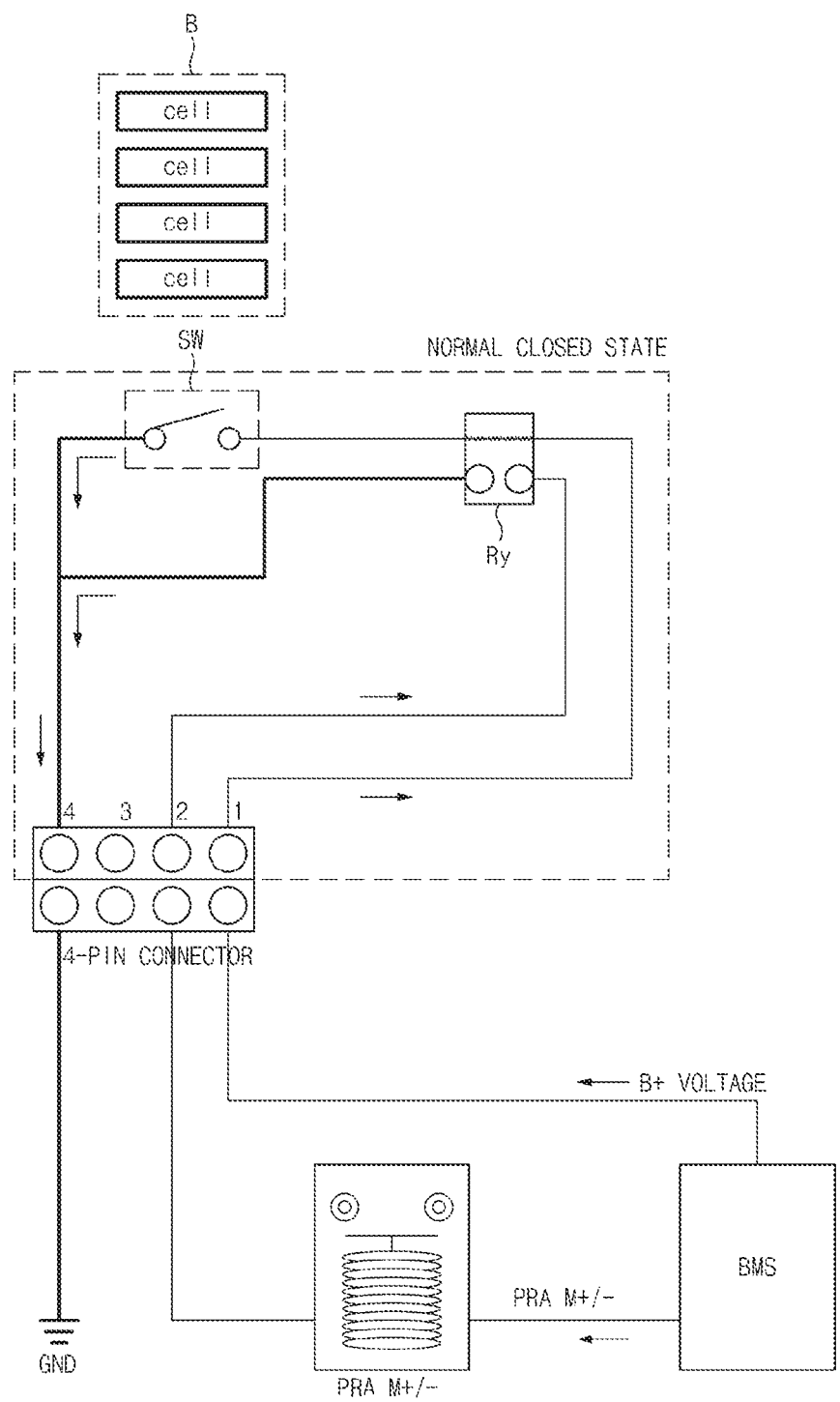
FIG. 1 is a diagram schematically illustrating an apparatus for preventing overcharge according to the related art.
Figure 2:
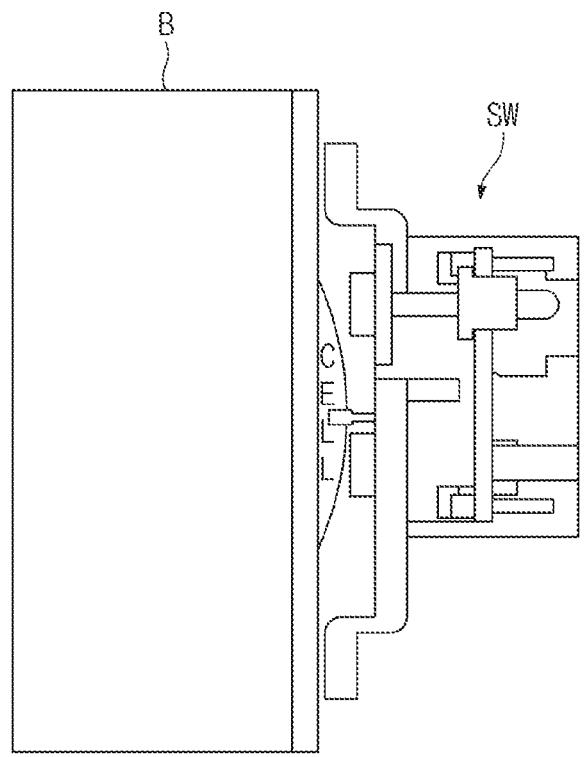
FIG. 2 is an illustrative view illustrating an operation of a switch by a cell expansion at the time of overcharge according to the related art.
Figure 3:
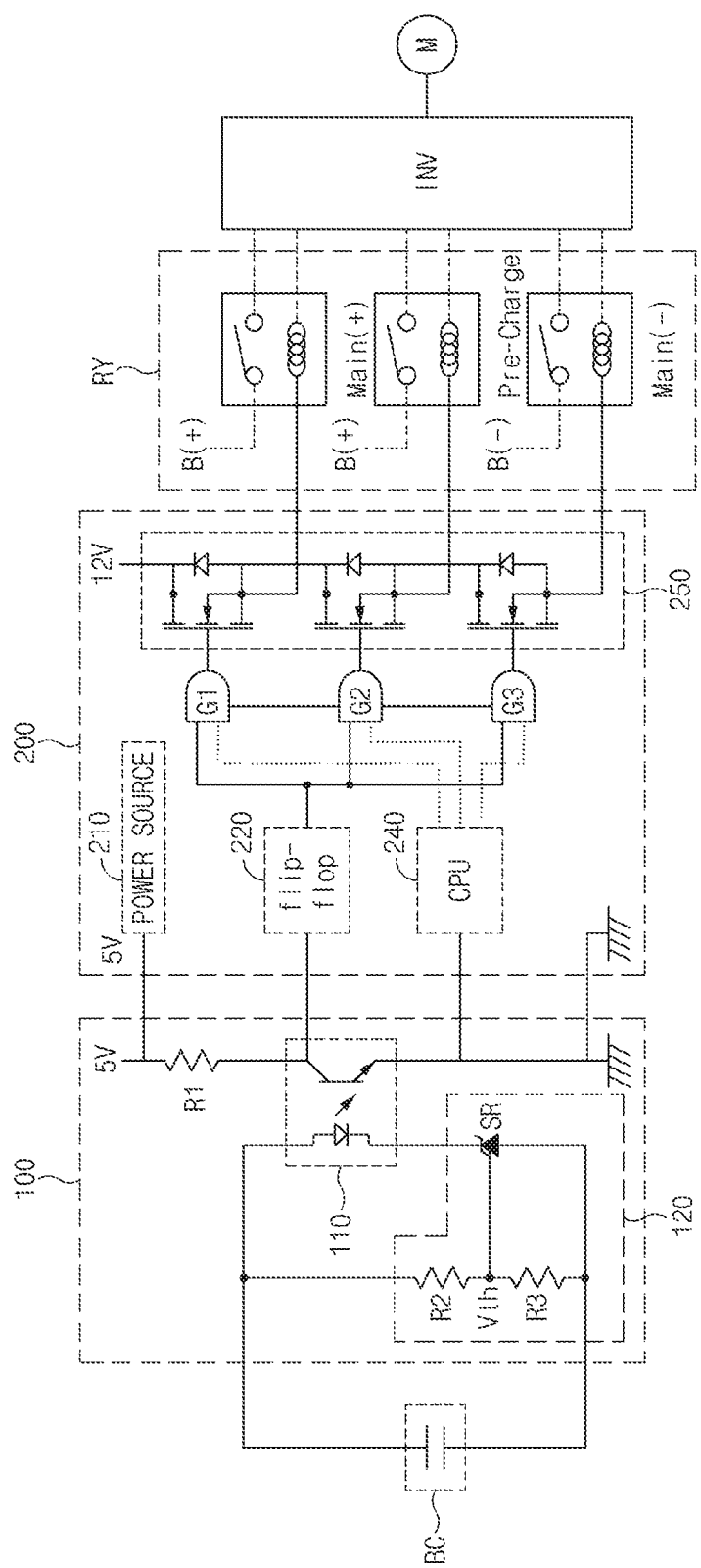
FIG. 3 is a circuit diagram of an apparatus for preventing overcharge of a battery in an eco-vehicle according to a first exemplary embodiment in the present disclosure.

FIG. 3 illustrates a circuit diagram of an apparatus for preventing overcharge of a battery in an eco-vehicle according to a first exemplary embodiment in the present disclosure.

As illustrated in FIG. 3, the apparatus for preventing overcharge of the battery includes a detector 100 and a signal processor 200. Here, the signal processor 200 may be the battery management system (BMS).

The detector 100 senses the overcharge of the battery to thereby detect an overcharge failure. The detector 100 monitors a voltage (hereinafter, referred to as a cell voltage) of a battery cell (BC) to thereby sense the overcharge. For example, when the cell voltage exceeds a reference voltage, the detector 100 senses the cell voltage as the overcharge.

The detector 100 may include a photo-coupler 110 and an overcharge sensor 120.

The photo-coupler 110 outputs an overcharge detection signal when overcharge of the battery occurs. The photo-coupler 110 includes a light emitting diode (a light emitting unit) and a phototransistor (a light receiving unit), and is separated from the signal processor 200 to be insulated. An anode of the light emitting diode of a primary side of the photo-coupler 110 is connected to the battery cell (BC). A collector of the phototransistor of a secondary side of the photo-coupler 110 is connected to one end of a resistor R1, and the other end of the resistor R1 is connected to a power source 210 of the signal processor 200.

The overcharge sensor 120 is connected to the primary side of the photo-coupler 110 to sense the overcharge of the battery. The overcharge sensor 120 includes a plurality of resistors R2 and R3 that set a reference voltage Vth, and a shunt regulator SR through which a current flows when the voltage of the battery cell BC exceeds the reference voltage. The reference voltage Vth is set by adjusting resistance values of the resistors R2 and R3. The reference voltage Vth, which is an overcharge protection level, is a reference judging whether or not the battery is overcharged.

When the cell voltage exceeds the reference voltage (at the time of the overcharge), the current flows through a rectifier SR such that a low (L) signal ('0' signal) is output through the photo-coupler 110. In other words, when the battery is overcharged, the detector 100 outputs the overcharge detection signal through the photo-coupler 110.

The signal processor 200 turns on or off a high voltage relay RY according to the detection signal output from the detector 100 to thereby respectively allow or block a charge of the battery. The high voltage relay RY, which is a power relay assembly (PRA), allows or blocks the charge of the battery using regenerative power generated by a motor M at the time of braking. An inverter INV is disposed between the high voltage relay RY and the motor M to convert the regenerative power generated by the motor M into a charge voltage for charging the battery.

The signal processor 200 includes a power source 210, a flip-flop 220, a plurality of logical elements G1 to G3, a controller 240, and a driver 250.

The power source 210 supplies power to the detector 100. The power source 210 supplies the power to the secondary side of the photo-coupler 110 of the detector 100. The power source 210 outputs a voltage of 5V.

The flip-flop 220 is connected to the secondary side of the photo-coupler 110 of the detector 100 to thereby receive the overcharge detection signal output from the photo-coupler 110. In addition, the flip-flop 220 outputs an output signal according to the overcharge detection signal.

The controller 240 initiates a monitoring of the battery when it senses a start-on signal. When the vehicle starts, the controller 240 operates an overcharge protection function of the battery. For example, the controller 240 outputs a high H signal ('1' signal) to initiate an overcharge protection function operation, and outputs a low signal to stop the overcharge protection function operation.

The controller 240 may be implemented as a central processing unit (CPU) of the signal processor 200. In other words, the controller 240 controls a general operation of the battery management system.

The plurality of logical elements G1 to G3 receive the signal output from the flip-flop 220 and the output signal of the controller 240 as an input to perform a logic product (AND) operation. The logical element is implemented as an AND gate.

The driver 250 includes a plurality of switches connected to the plurality of logical elements G1 to G3, respectively. Each of the switches is turned on or off according to an output of each of the logical elements G1 to G3 to which the switches are connected to thereby turn on or off the high voltage relay RY. Here, the switch, which is a low voltage switch, may be implemented by a metal oxide silicon field effect transistor (MOSFET).

Hereinafter, an operation of the apparatus for preventing overcharge of a battery according to the present exemplary embodiment will be described.

First, when the vehicle starts, the detector 100 initiates an operation thereof. That is, the detector 100 monitors the cell voltage of the battery. When the cell voltage of the battery exceeds the reference voltage, the detector 100 outputs the overcharge detection signal. The overcharge detection signal is a signal informing whether or not the battery is overcharged. When an overcharge of the battery is detected, the low signal is output, and when the overcharge of the battery is not detected, the high signal is output.

When the output signal output from the detector 100 falls from the high signal to the low signal, the flip-flop 220 of the signal processor 200 outputs the low signal. Depending on the output signal of the flip-flop 200, low voltage switches of the driver 250 are turned off. When the low voltage switches of the driver 250 are turned off, the high voltage relay RY is turned off, thereby preventing the overcharge of the battery.

Figure 4:
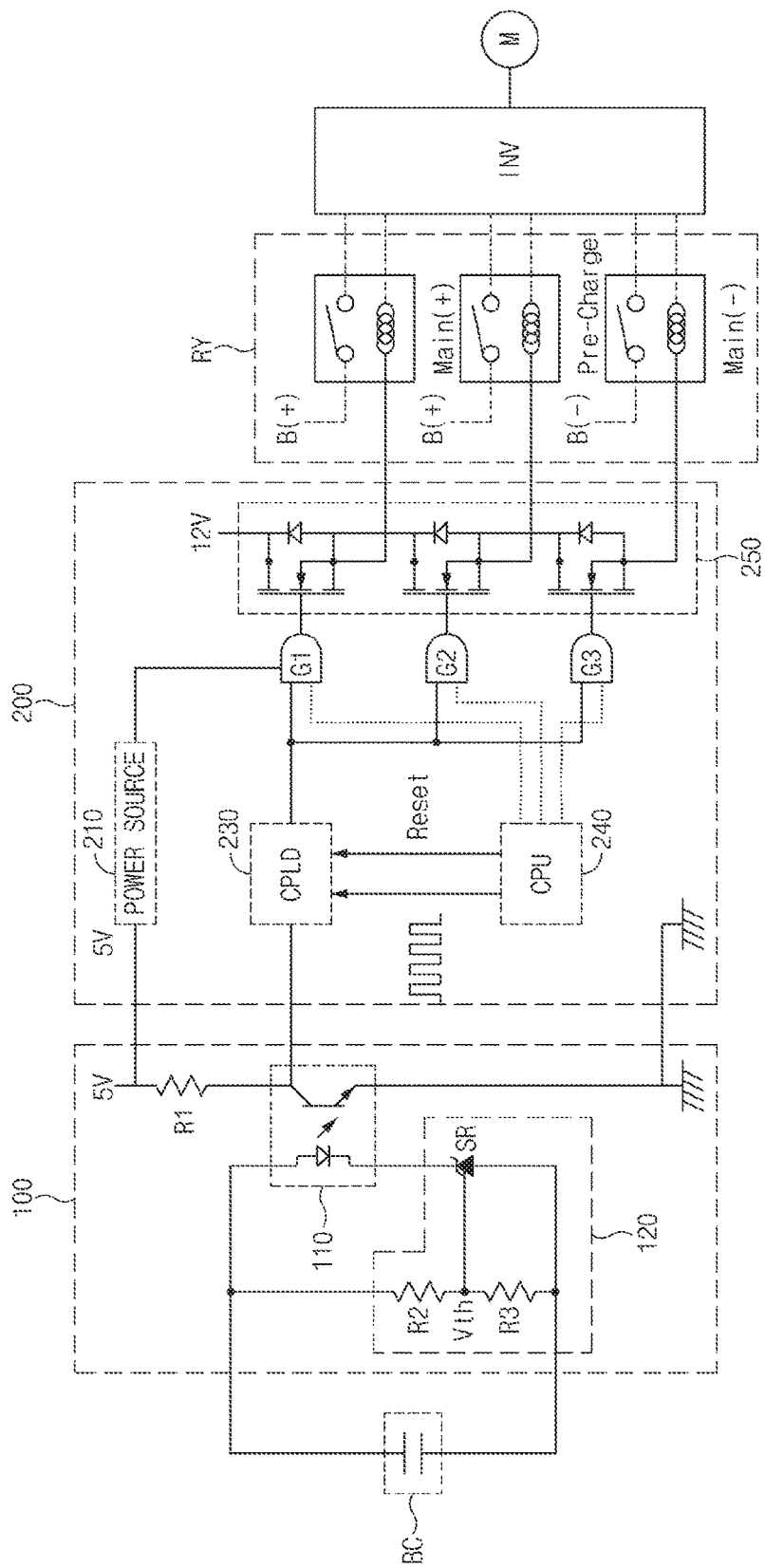
FIG. 4 is a circuit diagram of an apparatus for preventing overcharge of a battery in an eco-vehicle according to a second exemplary embodiment in the present disclosure.

FIG. 4 illustrates a circuit diagram of an apparatus for preventing overcharge of a battery in an eco-vehicle according to a second exemplary embodiment in the present disclosure.

The apparatus for preventing overcharge of a battery includes a detector 100 and a signal processor 200.

The detector 100 senses the overcharge of the battery to thereby detect an overcharge failure. The detector 100 monitors a voltage (hereinafter, referred to as a cell voltage) of a battery cell (BC) to thereby sense the overcharge. For example, when the cell voltage exceeds a reference voltage, the detector 100 senses the cell voltage as the overcharge.

The detector 100 may include a photo-coupler 110 and an overcharge sensor 120.

The photo-coupler 110 outputs an overcharge detection signal when the overcharge of the battery occurs. The photo-coupler 110 includes a light emitting diode (a light emitting unit) and a phototransistor (a light receiving unit), and is separated from the signal processor 200 to be insulated. An anode of the light emitting diode of a primary side of the photo-coupler 110 is connected to the battery cell (BC). A collector of the phototransistor of a secondary side of the photo-coupler 110 is connected to one end of a resistor R1, and the other end of the resistor R1 is connected to a power source 210 of the signal processor 200.

The overcharge sensor 120 is connected to the primary side of the photo-coupler 110 to sense the overcharge of the battery. The overcharge sensor 120 includes a plurality of resistors R2 and R3 that set a reference voltage Vth, and a shunt regulator SR through which a current flows when the voltage of the battery cell BC exceeds the reference voltage. The reference voltage Vth is set by adjusting resistance values of the resistors R2 and R3. The reference voltage Vth, which is an overcharge protection level, is a reference judging whether or not the battery is overcharged.

When the cell voltage exceeds the reference voltage (at the time of the overcharge), the current flows through a rectifier SR such that a low (L) signal ('0' signal) is output through the photo-coupler 110. In other words, when the battery is overcharged, the detector 100 outputs the overcharge detection signal through the photo-coupler 110.

The signal processor 200 turns on or off a high voltage relay RY according to the detection signal output from the detector 100 to thereby respectively allow or block a charge of the battery. The high voltage relay RY, which is a power relay assembly (PRA), allows or blocks the charge of the battery using regenerative power generated by a motor M at the time of braking. An inverter INV is disposed between the high voltage relay RY and the motor M to convert the regenerative power generated by the motor M into a charge voltage for charging the battery.

The signal processor 200 includes a power source 210, a programmable device 230, a plurality of logical elements G1 to G3, a controller 240, and a driver 250.

The power source 210 supplies power to the detector 100. The power source 210 may supply the power to the secondary side of the photo-coupler 110 of the detector 100. The power source 210 outputs a voltage of 5V.

The programmable device 230 receives the overcharge detection signal output from the detector 100, and judges whether or not a failure occurs based on the received overcharge detection signal. For example, when the programmable device 230 receives the overcharge detection signal, the programmable device 230 recognizes the received overcharge detection signal as an overcharge failure to thereby output a low signal. Meanwhile, when the programmable device 230 receives an overcharge non-detection signal, the programmable device 230 recognizes the received overcharge non-detection signal as a non-failure to thereby output a high signal.

The programmable device 230 may be implemented as a complex programmable logic device (CPLD).

The controller 240 outputs a reset command and a pulse signal to the programmable device 230 to initialize the programmable device 230. Here, the pulse signal is a signal informing whether or not the controller 240 is normal when the programmable device 230 is initialized.

The plurality of logical elements G1 to G3 receive a judgment result of the programmable device 230 and the output of the controller 240 as an input to perform a logic product (AND) operation. The logical element G1, G2, or G3 may be implemented as an AND gate.

The driver 250 includes a plurality of switches connected to the plurality of logical elements G1 to G3, respectively. Each of the switches is turned on or off according to an output of each of the logical elements G1 to G3 to which the switches are connected to thereby turn on or off the high voltage relay RY.

Hereinafter, an operation of the apparatus for preventing overcharge of a battery according to the present exemplary embodiment will be described.

When the vehicle starts, the detector 100 initiates a monitoring of the cell voltage of the battery. When the cell voltage of the battery exceeds the reference voltage, the detector 100 outputs the overcharge detection signal. The overcharge detection signal is a signal informing whether or not the battery is overcharged, wherein when the overcharge of the battery is detected, the low signal is output, and when the overcharge of the battery is not detected, the high signal is output.

When the low signal is output from the detector 100 during a set time or more, the programmable device 230 judges the output low signal as an overcharge failure signal. In addition, the programmable device 230 outputs the low signal. Depending on the output signal of the programmable device 230, low voltage switches of the driver 250 are turned off. When the low voltage switches of the driver 250 are turned off, the high voltage relay RY is turned off, thereby preventing the overcharge of the battery.

Meanwhile, when the low signal is output from the detector 100 during less than a preset time, the programmable device 230 judges the corresponding input signal as noise. Therefore, the programmable device 230 controls the driver 250 to turn on the high voltage relay RY, thereby allowing the battery to be charged.

Figure 5:
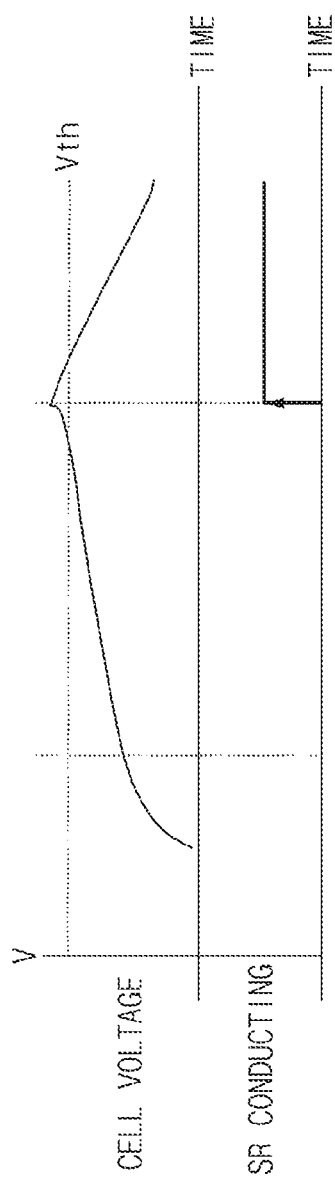
FIG. 5 is a graph illustrating an operation of a detector 100 illustrated in FIGS. 3 and 4.

FIG. 5 is a graph illustrating an operation of a detector 100 illustrated in FIGS. 3 and 4.

As illustrated in FIG. 5, when the cell voltage exceeds the reference voltage Vth, a current flows through the shunt regulator (SR). When the current flows through the shunt regulator (SR), the current flows through the light emitting diode of the primary side of the photo-coupler 110 and the phototransistor of the secondary side, such that the low signal is output. That is, the detector 100 outputs the overcharge detection signal informing the overcharge of the battery.

Figure 6:
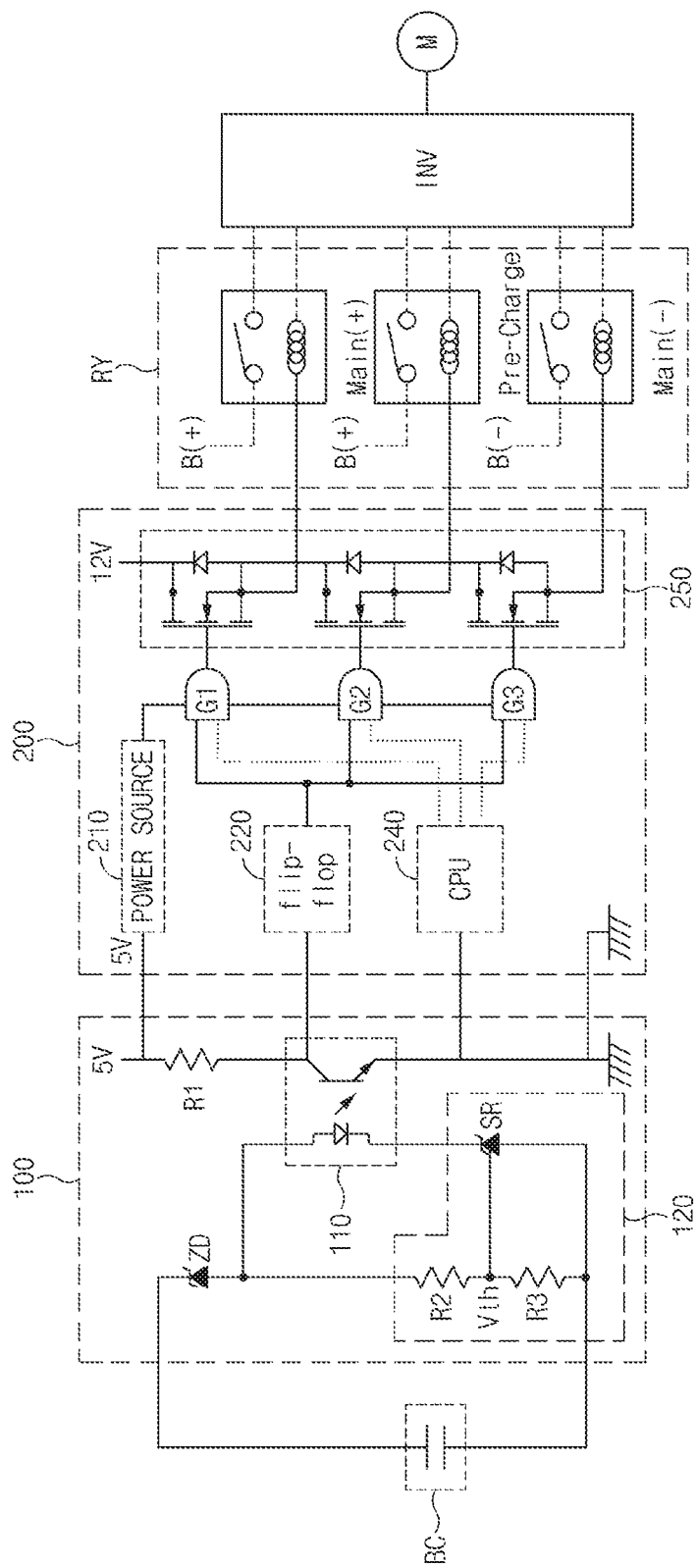
FIG. 6 is a circuit diagram of an apparatus for preventing overcharge of a battery in an eco-vehicle according to a third exemplary embodiment in the present disclosure.

FIG. 6 illustrates a circuit diagram of an apparatus for preventing overcharge of a battery in an eco-vehicle according to a third exemplary embodiment in the present disclosure.

The apparatus for preventing overcharge of a battery includes a detector 100 and a signal processor 200.

The detector 100 senses the overcharge of the battery to thereby detect an overcharge failure. The detector 100 monitors a voltage (hereinafter, referred to as a cell voltage) of a battery cell (BC) to thereby sense the overcharge. For example, when the cell voltage exceeds a reference voltage, the detector 100 senses the cell voltage as the overcharge.

The detector 100 may include a zener diode (ZD), a photo-coupler 110 and an overcharge sensor 120.

The zener diode (ZD) is disposed between the battery cell (BC) and the primary side of the photo-coupler 110. The zener diode (ZD) does not operate up to a set threshold voltage to prevent a dark current. Here, the set voltage refers to a breakdown voltage Vbr of the zener diode (ZD), which is about 4V.

When the cell voltage exceeds the threshold voltage, the zener diode (ZD) initiates the operation of the detector 100. In other words, when the cell voltage exceeds the breakdown voltage of the zener diode (ZD), the detector 100 starts to monitor the cell voltage for an overcharge protection.

The photo-coupler 110 outputs an overcharge detection signal when the overcharge of the battery occurs. The photo-coupler 110 includes a light emitting diode (a light emitting unit) and a phototransistor (a light receiving unit), and is separated from the signal processor 200 to be insulated. An anode of the light emitting diode of a primary side of the photo-coupler 110 is connected to the battery cell (BC). A collector of the phototransistor of a secondary side of the photo-coupler 110 is connected to one end of a resistor R1, and the other end of the resistor R1 is connected to a power source 210 of the signal processor 200.

The overcharge sensor 120 is connected to the primary side of the photo-coupler 110 to sense the overcharge of the battery. The overcharge sensor 120 includes a plurality of resistors R2 and R3 that set a reference voltage Vth, and a shunt regulator SR through which a current flows when the voltage of the battery cell BC exceeds the reference voltage. One end of the resistor R2 is connected to the zener diode (ZD) and the anode of the light emitting diode of the photo-coupler 110, and the other end of the resistor R2 is connected in series with the resistor R3. A contact point between the resistors R2 and R3 is connected to a gate of a rectifier SR to control a current flow through the rectifier SR. The reference voltage Vth is set by adjusting resistance values of the resistors R2 and R3. The reference voltage Vth, which is an overcharge protection level, is a reference judging whether or not the battery is overcharged.

When the cell voltage exceeds the reference voltage Vth (at the time of the overcharge), the current flows through the rectifier SR such that a low (L) signal ('0' signal) is output through the photo-coupler 110. In other words, when the battery is overcharged, the detector 100 outputs the overcharge detection signal through the photo-coupler 110. Meanwhile, when cell voltage is the reference voltage Vth or less, the detector 100 outputs an overcharge non-detection signal ('H' signal) through the photo-coupler 110.

The signal processor 200 turns on or off a high voltage relay RY according to the detection signal output from the detector 100 to thereby respectively allow or block a charge of the battery. The high voltage relay RY, which is a power relay assembly (PRA), allows or blocks the charge of the battery using regenerative power generated by a motor M at the time of braking. An inverter INV is disposed between the high voltage relay RY and the motor M to convert the regenerative power generated by the motor M into a charge voltage for charging the battery.

The signal processor 200 includes a power source 210, a flip-flop 220, a plurality of logical elements G1 to G3, a controller 240, and a driver 250.

The power source 210 supplies power to the detector 100. The power source 210 may supply the power to the secondary side of the photo-coupler 110 of the detector 100. The power source 210 outputs a voltage of 5V.

The flip-flop 220 is connected to the secondary side of the photo-coupler 110 of the detector 100 to thereby receive the overcharge detection signal output from the photo-coupler 110. In addition, the flip-flop 220 outputs an output signal according to the overcharge detection signal.

The controller 240 initiates a monitoring of the battery when it senses a start-on signal. When the vehicle starts, the controller 240 operates an overcharge protection function of the battery. For example, the controller 240 outputs a high H signal ('1' signal) to initiate an overcharge protection function operation, and outputs a low signal to stop the overcharge protection function operation.

The controller 240 may be implemented as a central processing unit (CPU) of the signal processor 200. In other words, the controller 240 controls a general operation of the battery management system.

The plurality of logical elements G1 to G3 receive the signal output from the flip-flop 220 and the output signal of the controller 240 as an input to perform a logic product (AND) operation. The logical element may be implemented as an AND gate.

The driver 250 includes a plurality of switches connected to the plurality of logical elements G1 to G3, respectively. Each of the switches is turned on or off according to an output of each of the logical elements G1 to G3 to which the switches are connected to thereby turn on or off the high voltage relay RY. Here, the switch, which is a low voltage switch, may be implemented by a metal oxide silicon field effect transistor (MOSFET).

Hereinafter, an operation of the apparatus for preventing overcharge of a battery according to the present exemplary embodiment will be described.

First, when the vehicle starts, the zener diode (ZD) of the detector 100 operates the detector 100 in the case in which the cell voltage exceeds the set threshold voltage. That is, the detector 100 monitors the cell voltage of the battery. When the cell voltage of the battery exceeds the reference voltage, the detector 100 outputs the overcharge detection signal. The overcharge detection signal is a signal informing whether or not the battery is overcharged. When the overcharge of the battery is detected, the overcharge detection signal (L signal) is output, and when the overcharge of the battery is not detected, the overcharge non-detection signal (H signal) is output.

When the output signal output from the detector 100 falls from the high signal to the low signal, the flip-flop 220 of the signal processor 200 outputs the low signal. Depending on the output signal of the flip-flop 200, low voltage switches of the driver 250 are turned off. When the low voltage switches of the driver 250 are turned off, the high voltage relay RY is turned-off, thereby preventing the overcharge of the battery.

Figure 7:
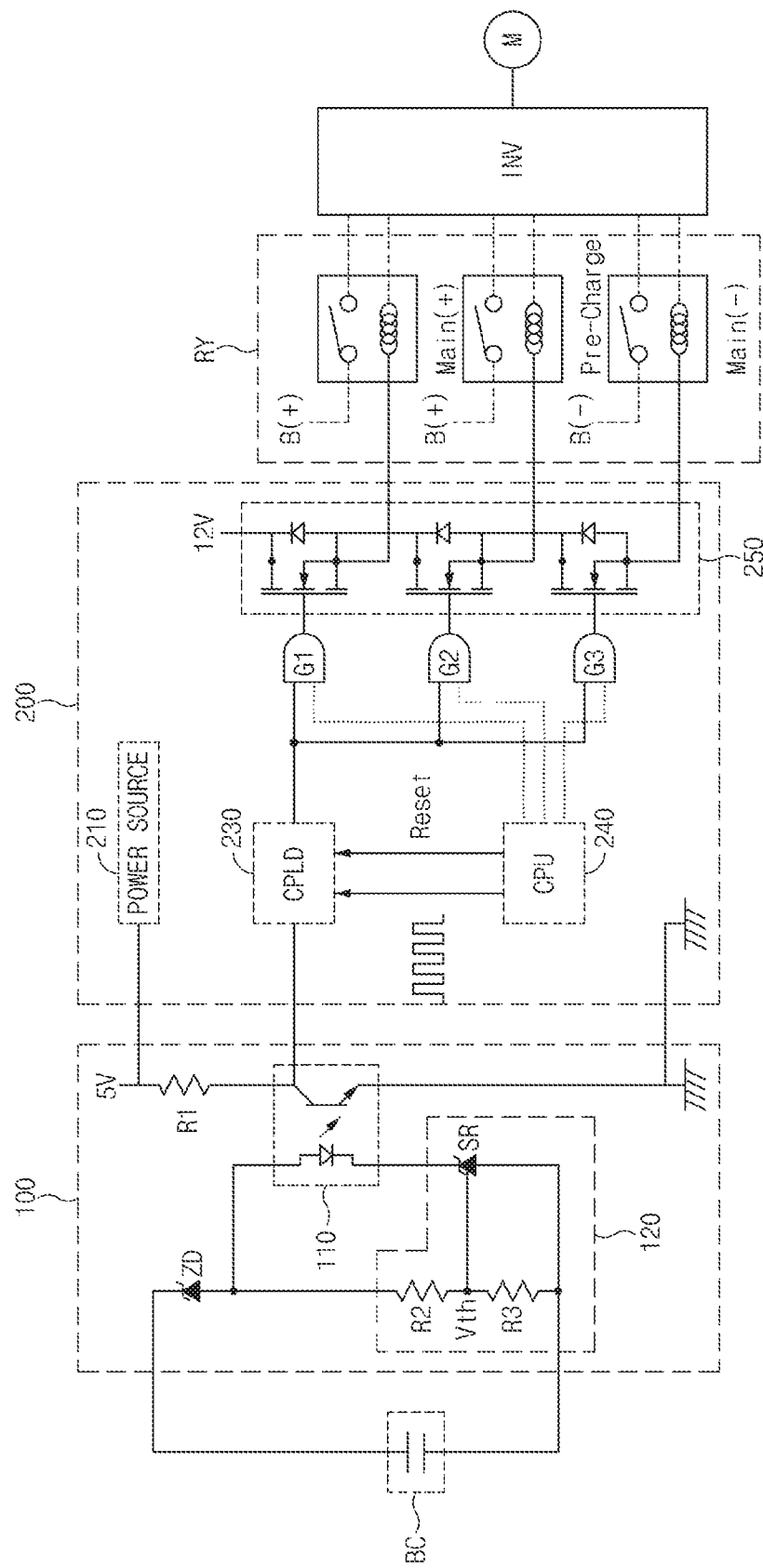
FIG. 7 is a circuit diagram of an apparatus for preventing overcharge of a battery in an eco-vehicle according to a fourth exemplary embodiment in the present disclosure.

FIG. 7 illustrates a circuit diagram of an apparatus for preventing overcharge of a battery in an eco-vehicle according to a fourth exemplary embodiment in the present disclosure.

The apparatus for preventing overcharge of a battery includes a detector 100 and a signal processor 200.

The detector 100 senses the overcharge of the battery to thereby detect an overcharge failure. The detector 100 monitors a voltage (hereinafter, referred to as a cell voltage) of a battery cell (BC) to thereby sense the overcharge. For example, when the cell voltage exceeds a reference voltage, the detector 100 senses the cell voltage as the overcharge.

The detector 100 may include a zener diode (ZD), a photo-coupler 110 and an overcharge sensor 120.

The zener diode (ZD) is disposed between the battery cell (BC) and the primary side of the photo-coupler 110. The zener diode (ZD) does not operate up to a set threshold voltage to prevent a dark current. Here, the set voltage refers to a breakdown voltage Vbr of the zener diode (ZD), which is about 4V.

When the cell voltage exceeds the threshold voltage, the zener diode (ZD) initiates the operation of the detector 100. In other words, when the cell voltage exceeds the breakdown voltage of the zener diode (ZD), the detector 100 start to monitor the cell voltage for an overcharge protection.

The photo-coupler 110 outputs an overcharge detection signal when the overcharge of the battery occurs. The photo-coupler 110 includes a light emitting diode (a light emitting unit) and a phototransistor (a light receiving unit), and is separated from the signal processor 200 to be insulated. An anode of the light emitting diode of a primary side of the photo-coupler 110 is connected to the battery cell (BC). A collector of the phototransistor of a secondary side of the photo-coupler 110 is connected to one end of a resistor R1, and the other end of the resistor R1 is connected to a power source 210 of the signal processor 200.

The overcharge sensor 120 is connected to the primary side of the photo-coupler 110 to sense the overcharge of the battery. The overcharge sensor 120 includes a plurality of resistors R2 and R3 that set a reference voltage Vth, and a shunt regulator SR through which a current flows when the voltage of the battery cell BC exceeds the reference voltage. One end of the resistor R2 is connected to the zener diode (ZD) and the anode of the light emitting diode of the photo-coupler 110, and the other end of the resistor R2 is connected in series with the resistor R3. A contact point between the resistors R2 and R3 is connected to a gate of a rectifier SR to control a current flow through the rectifier SR. The reference voltage Vth is set by adjusting resistance values of the resistors R2 and R3. The reference voltage Vth, which is an overcharge protection level, is a reference judging whether or not the battery is overcharged.

When the cell voltage exceeds the reference voltage Vth (at the time of the overcharge), the current flows through the rectifier SR such that a low (L) signal ('0' signal) is output through the photo-coupler 110. In other words, when the battery is overcharged, the detector 100 outputs the overcharge detection signal through the photo-coupler 110. Meanwhile, when cell voltage is the reference voltage Vth or less, the detector 100 outputs an overcharge non-detection signal ('H' signal) through the photo-coupler 110.

The signal processor 200 turns on or off a high voltage relay RY according to the detection signal output from the detector 100 to thereby allow or block a charge of the battery. The high voltage relay RY, which is a power relay assembly (PRA), allows or blocks the charge of the battery using regenerative power generated by a motor M at the time of braking. An inverter INV is disposed between the high voltage relay RY and the motor M to convert the regenerative power generated by the motor M into a charge voltage for charging the battery.

The signal processor 200 includes a power source 210, a programmable device 230, a plurality of logical elements G1 to G3, a controller 240, and a driver 250.

The power source 210 supplies power to the detector 100. The power source 210 may supply the power to the secondary side of the photo-coupler 110 of the detector 100. The power source 210 outputs a voltage of 5V.

The programmable device 230 receives the overcharge detection signal output from the detector 100, and judges whether or not a failure occurs based on the received overcharge detection signal. For example, when the programmable device 230 receives the overcharge detection signal, the programmable device 230 recognizes the received overcharge detection signal as an overcharge failure to thereby output a low signal. Meanwhile, when the programmable device 230 receives an overcharge non-detection signal, the programmable device 230 recognizes the received overcharge non-detection signal as a non-failure to thereby output a high signal.

The programmable device 230 may be implemented as a complex programmable logic device (CPLD).

The controller 240 outputs a reset command and a pulse signal to the programmable device 230 to initialize the programmable device 230. Here, the pulse signal is a signal informing whether or not the controller 240 is normal when the programmable device 230 is initialized.

The plurality of logical elements G1 to G3 receive a judgment result of the programmable device 230 and the output of the controller 240 as an input to perform a logic product (AND) operation. The logical element G1, G2, or G3 is implemented as an AND gate.

The driver 250 includes a plurality of switches connected to the plurality of logical elements G1 to G3, respectively. Each of the switches is turned on or off according to an output of each of the logical elements G1 to G3 to which the switches are connected to thereby turn on or off the high voltage relay RY.

Hereinafter, an operation of the apparatus for preventing overcharge of a battery according to the present exemplary embodiment will be described.

When the vehicle starts, the zener diode (ZD) of the detector 100 operates the detector 100 in the case in which the cell voltage exceeds the set threshold voltage. That is, the detector 100 monitors the cell voltage of the battery. When the cell voltage of the battery exceeds the reference voltage, the detector 100 outputs the overcharge detection signal. The overcharge detection signal is a signal informing whether or not the battery is overcharged, wherein when the overcharge of the battery is detected, the overcharge detection signal (L signal) is output, and when the overcharge of the battery is not detected, the overcharge non-detection signal (H signal) is output.

When the low signal is output from the detector 100 during a set time or more, the programmable device 230 judges the input low signal as an overcharge failure signal. In addition, the programmable device 230 outputs the low signal. Depending on the output signal of the programmable device 230, low voltage switches of the driver 250 are turned off. When the low voltage switches of the driver 250 are turned off, the high voltage relay RY is turned-off, thereby preventing the overcharge of the battery.

Meanwhile, when the low signal is output from the detector 100 during less than a preset time, the programmable device 230 judges the corresponding input signal as noise. Therefore, the programmable device 230 controls the driver 250 to turn-on the high voltage relay RY, thereby allowing the battery to be charged.

Figure 8:
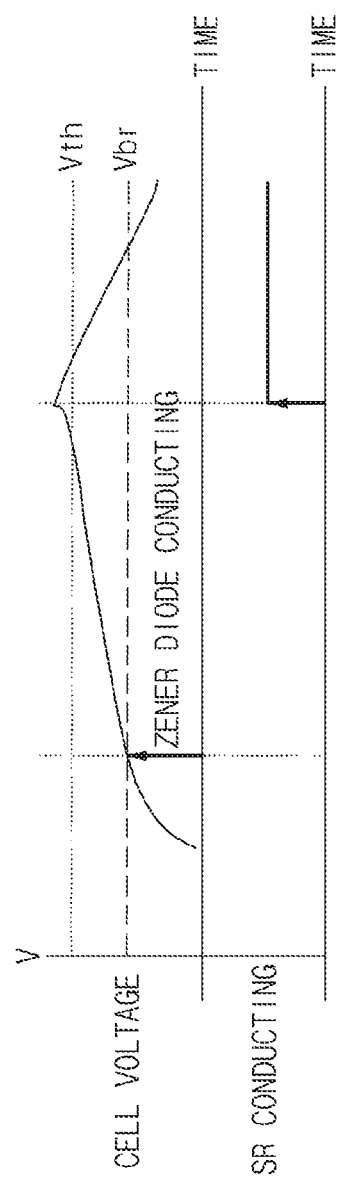
FIG. 8 is a graph illustrating an operation of a detector 100 illustrated in FIGS. 6 and 7.

FIG. 8 is a graph illustrating an operation of a detector 100 illustrated in FIGS. 6 and 7.

As illustrated in FIG. 8, when the cell voltage arrives at a set threshold voltage Vbr, the zener diode (ZD) is turned-on. That is, when the cell voltage becomes the set threshold voltage Vbr, the current flows through the zener diode (ZD).

Thereafter, when cell voltage exceeds the reference voltage Vth, the current flows through the shunt regulator (SR), such that the detector 100 starts to monitor the cell voltage.

Figure 9:
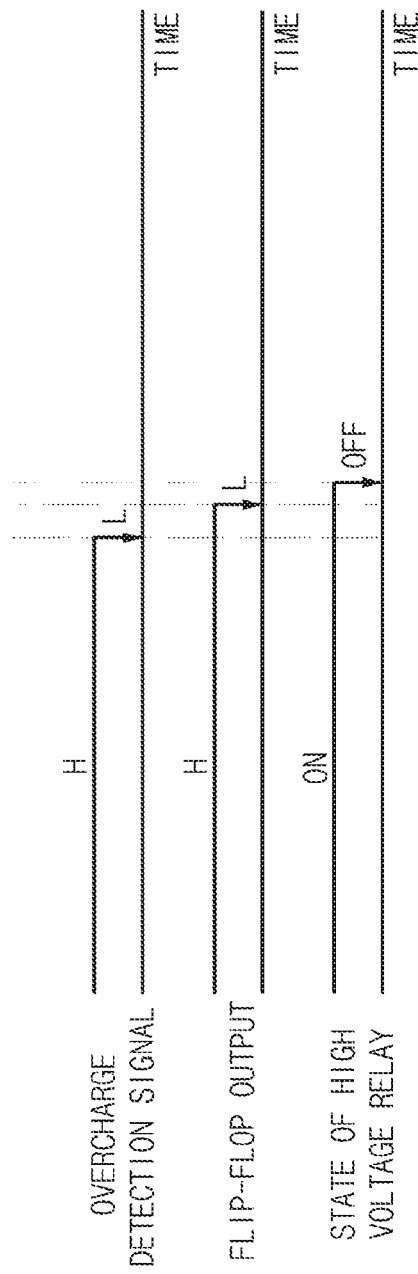
FIG. 9 is a diagram illustrating an operation sequence of a flip-flop 220 illustrating in FIGS. 3 and 6.

FIG. 9 is a diagram illustrating an operation sequence of a flip-flop 220 illustrating in FIGS. 3 and 6.

When the overcharge detection signal is output from the detector 100 while falling from the 'H' signal to the 'L' signal, the flip-flop 220 outputs the 'L' signal. That is, when the output signal output from the photo-coupler 110 of the detector 100 is converted from the 'H' signal to the 'L' signal, the flip-flop 220 outputs the 'L' signal depending on the output signal of the photo-coupler 110.

The high voltage relay RY is converted from an ON state to an OFF state depending on the output signal of the flip-flop 220. That is, the high voltage relay RY allows or blocks a charge of the battery using regenerative power generated at the time of braking of the vehicle depending on the output signal of the flip-flop 220. For example, when the output signal of the flip-flop 220 is the 'H' signal, the high voltage relay RY allows the charge of the battery, and when the output signal of the flip-flop 2220 is the 'L' signal, the high voltage relay RY blocks the charge of the battery.

Figure 10:
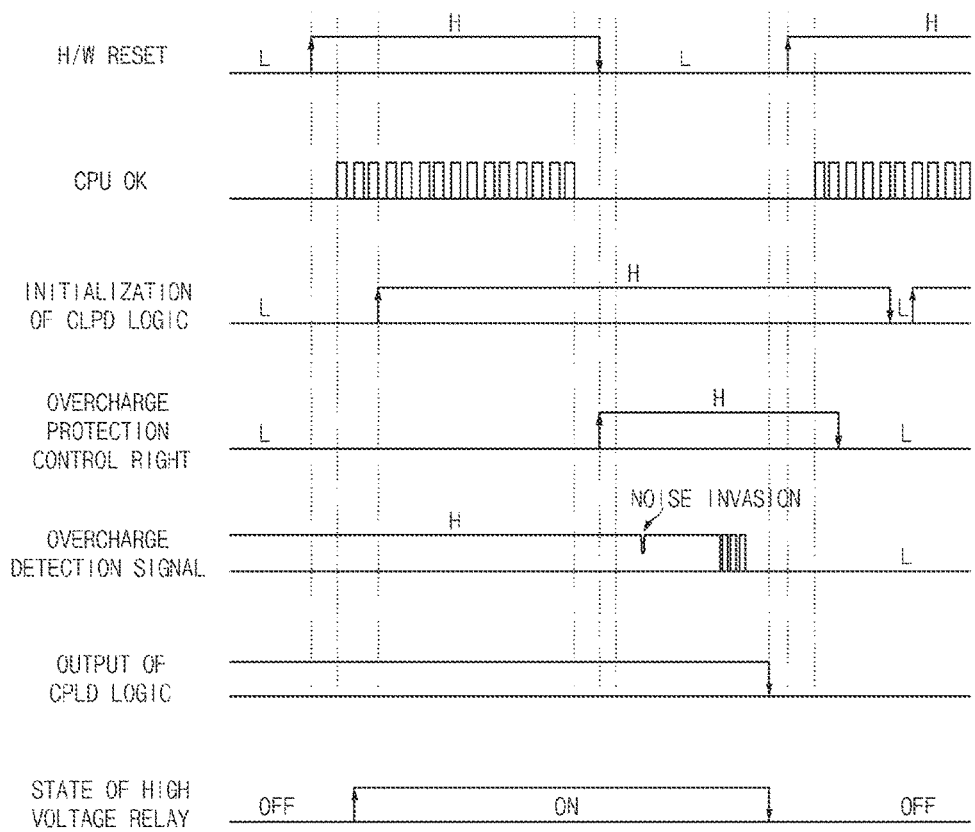
FIG. 10 is a diagram illustrating an operation sequence of a programmable device 23 illustrating in FIGS. 4 and 7.

FIG. 10 is a diagram illustrating an operation sequence of a programmable device 230 illustrating in FIGS. 4 and 7.

When the CPLD 230 receives an initialization (H/W RESET) signal and a pulse signal (CPU OK) from the controller 240, a logic of the CPLD 230 is initialized. When an input of the initialization signal is stopped, the CPLD 230 has an overcharge protection control right.

In the case in which the CPLD 230 receives the 'H' signal, which is the output signal output from the detector 100 after having the overcharge protection control right, when the 'H' signal is maintained during a set time or more, the CPLD 230 recognizes the received 'H' signal as the overcharge detection signal. When the overcharge detection signal is recognized, the CPLD 230 outputs the 'L' signal.

When the 'H' signal is not maintained during the set time or more, the CPLD 230 recognizes the 'H' signal as noise to thereby output the 'H' signal. Therefore, the signal processor 200 is superior in reliability of the overcharge detection (failure detection) at the time of a noise invasion.

The signal processor 200 may additionally include a sensing function of sensing abnormality of the controller 240.

Although it has been mentioned that all components configuring the exemplary embodiment of the present disclosure described above are combined with each other as one component or are combined and operated with each other as one component, the present disclosure is not necessarily limited to the above-described exemplary embodiment. That is, all the components may also be selectively combined and operated with each other as one or more components without departing from the scope of the present disclosure. In addition, although each of the components may be implemented by one independent hardware, some or all of the respective components which are selectively combined with each other may also be implemented by a computer program having a program module performing some or all of functions combined with each other in one or plural hardware. Codes and code segments configuring the computer program may be easily deduced by those skilled in the art. The computer program as described above may be stored in computer readable media, and be read and executed by a computer to implement the exemplary embodiments of the present disclosure.

As described above, according to the exemplary embodiments of the present disclosure, the apparatus for preventing overcharge of a battery in an eco-vehicle is a secondary protection technology capable of electrically preventing the overcharge of the battery even in the case in which the battery management system (BMS) in the eco-vehicle fails, and may implement a structural robustness by a minimal hardware change.

Further, according to the present disclosure, the battery management system may reduce or prevent overcharge risk according to an increase in capacity, energy density, and output density together with an improvement of performance of high output/high energization, thereby making it possible to improve the performance of the battery management system.

Further, according to the present disclosure, overcharge stability is improved, thereby making it possible to reduce after service (A/S) cost and to improve satisfaction of a user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for preventing an overcharge of a battery in an eco-vehicle, the apparatus comprising:
   a detector detecting the overcharge of the battery; and
   a signal processor controlling a high voltage relay according to an output signal output from the detector to block a charge of the battery, wherein the signal processor includes a sub signal processor outputting an output signal according to an overcharge detection signal from the detector, a plurality of logical elements, and a controller operating an overcharge protection function of the battery when the vehicle starts, and wherein the plurality of logical elements performs a logic operation using output signals output from the sub signal processor and the controller, and the signal processor controls the high voltage relay according to a result of the logic operation.

2. The apparatus according to claim 1, wherein the detector includes:

an overcharge sensor sensing whether or not a cell voltage of the battery exceeds a reference voltage; and a photo-coupler outputting an overcharge detection signal when the cell voltage exceeds the reference voltage.

3. The apparatus according to claim 2, wherein the overcharge sensor includes:

a plurality of resistors for setting the reference voltage; and a shunt regulator through which a current flows when the cell voltage exceeds the reference voltage.

4. The apparatus according to claim 2, wherein the detector further includes a zener diode disposed between a battery cell and the photo-coupler to control an operation initiation time point of an overcharge protection function of the battery.

5. The apparatus according to claim 2, wherein the detector initiates an operation of the overcharge protection function of the battery when the cell voltage arrives at a breakdown voltage of a zener diode.

6. The apparatus according to claim 1, wherein the signal processor further includes:

a power source supplying power to the detector; and a driver including a plurality of switches connected to the plurality of logical elements, respectively, and controlling operations of the plurality of switches according to a control signal output from the plurality of logical elements to drive a high voltage relay, wherein the sub signal processor is a flip-flop.

7. The apparatus according to claim 1, wherein the signal processor further includes:

a power source supplying power to the detector; and a driver including a plurality of switches connected to the plurality of logical elements, respectively, and controlling operations of the plurality of switches according to a control signal output from the plurality of logical elements to drive a high voltage relay, wherein the sub signal processor is a programmable device.

8. The apparatus according to claim 7, wherein the programmable device is a complex programmable logic device (CPLD).

9. The apparatus according to claim 7, wherein the controller controls an initialization of the programmable device.

10. The apparatus according to claim 1, wherein the detector detects the overcharge of the battery by monitoring a cell voltage of the battery.

11. The apparatus according to claim 1, wherein the signal processor controls the high voltage relay according to the output signal output from the detector to block the charge of the battery when the detector detects the overcharge of the battery.

12. The apparatus according to claim 1, wherein the battery is charged using regenerative power generated at a time of braking of the eco-vehicle.

* * * * *